United States Patent
Celinski et al.

(10) Patent No.: US 10,003,625 B2
(45) Date of Patent: *Jun. 19, 2018

(54) PORTABLE GROUP COMMUNICATION DEVICE AND METHOD OF USE

(71) Applicant: Loose Cannon Systems, Inc., Los Gatos, CA (US)

(72) Inventors: Peter Celinski, Los Gatos, CA (US); Aiden Riley Eller, Seattle, WA (US); Alwyn Joy George, New Delhi (IN); Naresh Kumar Gupta, New Delhi (IN)

(73) Assignee: Loose Cannon Systems, Inc., San Francisco, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/190,111

(22) Filed: Jun. 22, 2016

(65) Prior Publication Data
US 2016/0373583 A1 Dec. 22, 2016

Related U.S. Application Data

(60) Provisional application No. 62/182,956, filed on Jun. 22, 2015.

(51) Int. Cl.
*H04L 29/06* (2006.01)
*H04B 1/3827* (2015.01)
(Continued)

(52) U.S. Cl.
CPC ............ *H04L 65/60* (2013.01); *G06F 3/162* (2013.01); *G06F 3/165* (2013.01); *G10L 19/012* (2013.01);
(Continued)

(58) Field of Classification Search
CPC ....... H04L 65/60; H04M 3/563; H04M 3/568; H04M 1/72527; H04W 4/06; G06F 3/162;
(Continued)

(56) References Cited

U.S. PATENT DOCUMENTS 8,121,057 B1 2/2012 Botha et al.
8,433,050 B1 4/2013 Baten et al.
(Continued)

OTHER PUBLICATIONS

Dan Seifert, "The Onyx is a 'Star Trek' communicator for the real world", Nov. 5, 2014, www.theverge.com/2014/11/5/7157291/onbeep-onyx-personal-communicator, pp. 1-5.
(Continued)

*Primary Examiner* — Brandon J Miller
(74) *Attorney, Agent, or Firm* — Innovation Counsel LLP

(57) ABSTRACT

A portable communication device comprises a user interface, one or more digital processors in electronic communication with the user interface, and at least one memory in electronic communication with the one or more digital processors, the one or more digital processors and the at least one memory collectively configured to implement simultaneous radio frequency voice communication between a user of the device and multiple other ones of the devices. The voice communication comprises: transmitting audio data corresponding to speech of the user to each of the other ones of the devices, receiving audio data from each of the other ones of the devices, and transmitting the received audio data to the user so as to direct to the user combined and simultaneous speech of users of each of the other ones of the devices.

16 Claims, 7 Drawing Sheets

(51) Int. Cl.
*H04M 3/56* (2006.01)
*H04W 4/06* (2009.01)
*G10L 19/012* (2013.01)
*G06F 3/16* (2006.01)
*H04W 4/80* (2018.01)
*H04M 1/725* (2006.01)
*G10L 15/00* (2013.01)
*G10L 21/0208* (2013.01)
*H04W 88/02* (2009.01)

(52) U.S. Cl.
CPC .......... *H04B 1/3833* (2013.01); *H04M 3/563* (2013.01); *H04M 3/568* (2013.01); *H04W 4/06* (2013.01); *G10L 15/00* (2013.01); *G10L 2021/02082* (2013.01); *H04M 1/7253* (2013.01); *H04M 1/72527* (2013.01); *H04M 2250/74* (2013.01); *H04W 4/80* (2018.02); *H04W 88/02* (2013.01)

(58) Field of Classification Search
CPC ..... G06F 3/165; H04B 1/3833; G10L 19/012; G10L 15/00; G10L 2021/02082
See application file for complete search history.

(56) References Cited

U.S. PATENT DOCUMENTS

| | | | |
|---|---|---|---|
| 9,036,510 B1* | 5/2015 | Zhou | H04W 88/04 370/260 |
| 2003/0158900 A1 | 8/2003 | Santos | |
| 2005/0088981 A1 | 4/2005 | Woodruff et al. | |
| 2005/0136837 A1 | 6/2005 | Nurminen et al. | |
| 2005/0143103 A1* | 6/2005 | Bjorgan | H04M 3/42051 455/466 |
| 2005/0260988 A1* | 11/2005 | Kauppinen | H04W 4/08 455/435.3 |
| 2006/0229093 A1* | 10/2006 | Bhutiani | H04W 4/10 455/518 |
| 2008/0119227 A1 | 5/2008 | Cheng | |
| 2009/0276214 A1 | 11/2009 | Chong et al. | |
| 2010/0124321 A1* | 5/2010 | Alexandrov | H04L 65/403 379/202.01 |
| 2011/0136431 A1 | 6/2011 | Haaramo et al. | |
| 2012/0040646 A1 | 2/2012 | Garg et al. | |
| 2013/0293666 A1* | 11/2013 | Jiang | H04N 7/15 348/14.08 |
| 2014/0094119 A1* | 4/2014 | Stojanovski | H04W 52/0258 455/41.1 |
| 2014/0105096 A1* | 4/2014 | Wang | H04L 12/189 370/312 |
| 2014/0160996 A1 | 6/2014 | Hellhake et al. | |
| 2014/0282094 A1* | 9/2014 | Levine | H04L 65/403 715/753 |
| 2014/0362742 A1* | 12/2014 | Martinez | H04M 3/563 370/262 |
| 2014/0369491 A1* | 12/2014 | Kloberdans | H04M 1/6008 379/421 |
| 2016/0373501 A1 | 12/2016 | Celinski et al. | |
| 2016/0373899 A1 | 12/2016 | Celinski et al. | |

OTHER PUBLICATIONS

International Search Report for International Application No. PCT/US2016/038828, dated Nov. 17, 2016.
International Search Report for International Application No. PCT/US2016/038833, dated Nov. 22, 2016.
International Search Report for International Application No. PCT/US2016/038834, dated Nov. 22, 2016.

* cited by examiner

PORTABLE GROUP COMMUNICATION DEVICE AND METHOD OF USE

CROSS REFERENCE TO RELATED APPLICATIONS

This application claims priority to, and the benefit of, U.S. Provisional Patent Application No. 62/182,956 filed on Jun. 22, 2015, which is hereby incorporated by reference in its entirety and for all purposes.

BRIEF DESCRIPTION

Embodiments of the invention relate generally to wireless communication devices. More specifically, embodiments of the invention relate to wireless portable group communication devices and methods of their use.

BACKGROUND

Many different communications devices currently exist. However, each is suitable only for certain applications. For example, cellular telephones are useful for one-to-one communication, but do not typically lend themselves well to group communication, i.e. conversations involving more than two individuals at the same time. Devices such as walkie-talkies and other two-way radio systems suffer from similar drawbacks, in addition to often being half-duplex (meaning that only one person may speak at a time) rather than full-duplex (allowing two or more individuals to speak simultaneously), cumbersome to use, not secure, providing poor voice quality, having limited range, and other drawbacks. Some telecommunications devices allow for conference calling, but these devices are typically not portable or require a backbone network such as a cellular network.

Accordingly, ongoing efforts thus exist to create useful portable group communications devices.

SUMMARY

The invention can be implemented in many ways including as a portable communication device.

In one embodiment, a portable communication device comprises a user interface, one or more digital processors in electronic communication with the user interface, and at least one memory in electronic communication with the one or more digital processors, the one or more digital processors and the at least one memory collectively configured to implement simultaneous radio frequency voice communication between a user of the device and multiple other ones of the devices. The voice communication comprises: transmitting audio data corresponding to speech of the user to each of the other ones of the devices, receiving audio data from each of the other ones of the devices, and transmitting the received audio data to the user so as to direct to the user combined and simultaneous speech of users of each of the other ones of the devices.

The device may comprise a rigid housing, and the user interface may be positioned on the housing.

The user interface may include one or more of an electronic display, one or more buttons, one or more dials, a touch sensitive display, and an audible speech interface.

The audible speech interface may include one or more of an audio speaker interface and at least one microphone interface.

The device may further comprise computer readable instructions stored in the at least one memory, the instructions comprising instructions for carrying out one or more voice initiated processes.

The one or more voice initiated processes may include processes for one or more of voice activated transmission of the audio data, and determination of one or more commands from a voice of the user of the device.

The commands may include commands for muting the other ones of the devices, directing the transmitted audio data to only a subset of the other ones of the devices, and assigning an audible name to one or more of the other ones of the devices.

The one or more voice initiated processes may include processes for determining a volume of the speech of the user.

The device may further comprise computer readable instructions stored in the at least one memory, the instructions comprising instructions for initiating one or more of: a broadcast-only mode in which the receiving audio data, the mixing, and the transmitting the mixed audio data are disabled; an open mode allowing communication with devices besides the other ones of the devices; a determination of a quality of the received audio data; a determination of locations of the other ones of the devices; a determination of whether one of the other ones of the devices is out of range or approaching out of range; a determination of whether one of the other ones of the devices is turned off; transmission of a distress signal; a determination of a motionless state of one of the other ones of the devices; a reduction in noise of the received audio data; an echo reduction; a generation of a comfort noise; and a mixing of the received audio data with another audio data stream.

The another audio data stream may be a music stream.

The device may further comprise computer readable information stored in the at least one memory, the information corresponding to one or more notifications for the user.

The notifications may include one or more of a vibration alert, an illumination of a light, and a visual alert displayed on a display.

The notifications may include an audible alert.

The device may further comprise computer readable information stored in the at least one memory, the information corresponding to a voice recording.

The one or more digital processors and the at least one memory may be collectively further configured to establish a group with the other ones of the devices so that the voice communication occurs only between the user of the device and the other devices of the group.

The voice communication may further comprise mixing the received audio data, and the transmitting the received audio data further comprises transmitting the mixed audio data.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION

The various Figures are not necessarily to scale. All numerical values are approximate, and may vary. All examples of specific elements as well as their materials and compositions are to be taken as nonlimiting and exemplary only. Other suitable items, materials and compositions may be employed instead.

In one embodiment, the invention involves a small, lightweight and portable telecommunications device that allows group communication among a number of users who may be mobile. Each user of a group has a device, and each device allows for full-duplex communication with any other user of the group. The devices thus allow for new forms of group communication. For example, a group of hikers, cyclists, skiers, or the like may be able to communicate with each other in remote areas, even if they are hundreds of yards apart from one another and/or outside visible range. Furthermore, every member of the group may simultaneously be able to communicate with every other member of the group, rather than only being able to communicate with one other member, Furthermore, every member of the group may be able to communicate in full-duplex mode, rather than only being able to communicate in half-duplex mode.

These devices allow for many advantages. The small size and light weight of the devices allows users to easily carry and use these devices while on the move and engaged in physical and other activities for which carrying a device was previously inconvenient or awkward. The devices also allow communication over long ranges, such as radio range or the like. In this manner, groups of joggers, hikers, etc. may communicate with each other even if they are relatively far apart, at different elevations, behind obstacles such as walls, trees, etc. Devices of embodiments of the invention thus allow for many advantageous forms of group communication that were previously difficult if not impossible. For instance, groups of hikers may coordinate with each other to find a lost or injured member of their group even if that member is somewhat far away, or groups of cyclists may carry on a group conversation handsfree while riding.

Figure 1:
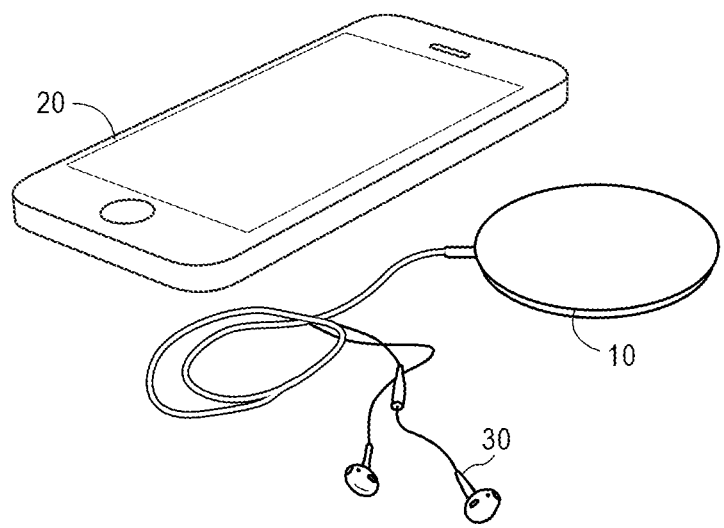
FIG. 1 conceptually illustrates a portable group communication device according to embodiments of the present invention.

FIG. 1 conceptually illustrates a portable group communication device according to embodiments of the present invention. A group communications device 10 is shown next to, and for optional use with, a cellular telephone 20. The group communications device 10 is a small, portable device that is of sufficiently small size and light weight to allow users to carry device 10 with them while remaining mobile and engaging in various activities, e.g. hiking, skiing, mountain climbing, etc.

Figure 2:
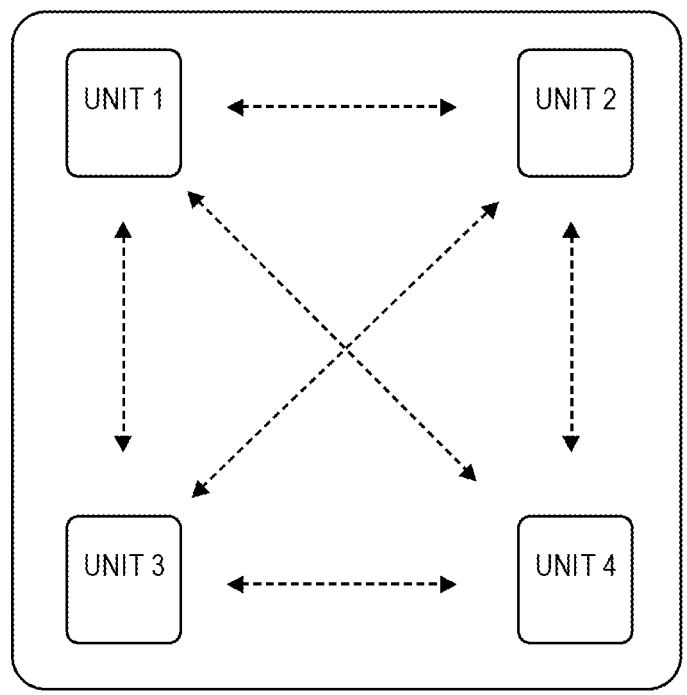
FIG. 2 illustrates use of multiple such portable group communication devices.

The device 10 allows users to communicate as part of a group, even without telephone 20. In particular, the user may employ optional headphones 30 to speak/listen to other members of the group, with the device 10 acting as a wireless transceiver both transmitting the user's voice (or other) communication to the devices 10 of other members of the group, and receiving voice (or other) communication from the other users as well. This is conceptually illustrated in FIG. 2, which graphically shows use of multiple such portable group communication devices. In FIG. 2, four different devices 10 are shown as units 1-4, each of which is a member of a group. As members of a particular group, each of these units 1-4 communicates with every other unit 1-4 in the group, as shown by the dotted lines. Thus, each unit 1-4 receives simultaneous communications from every other unit 1-4, and also transmits communications to every other unit 1-4. Accordingly, every user in the group may simultaneously communicate with every other member of the group.

Figure 3:
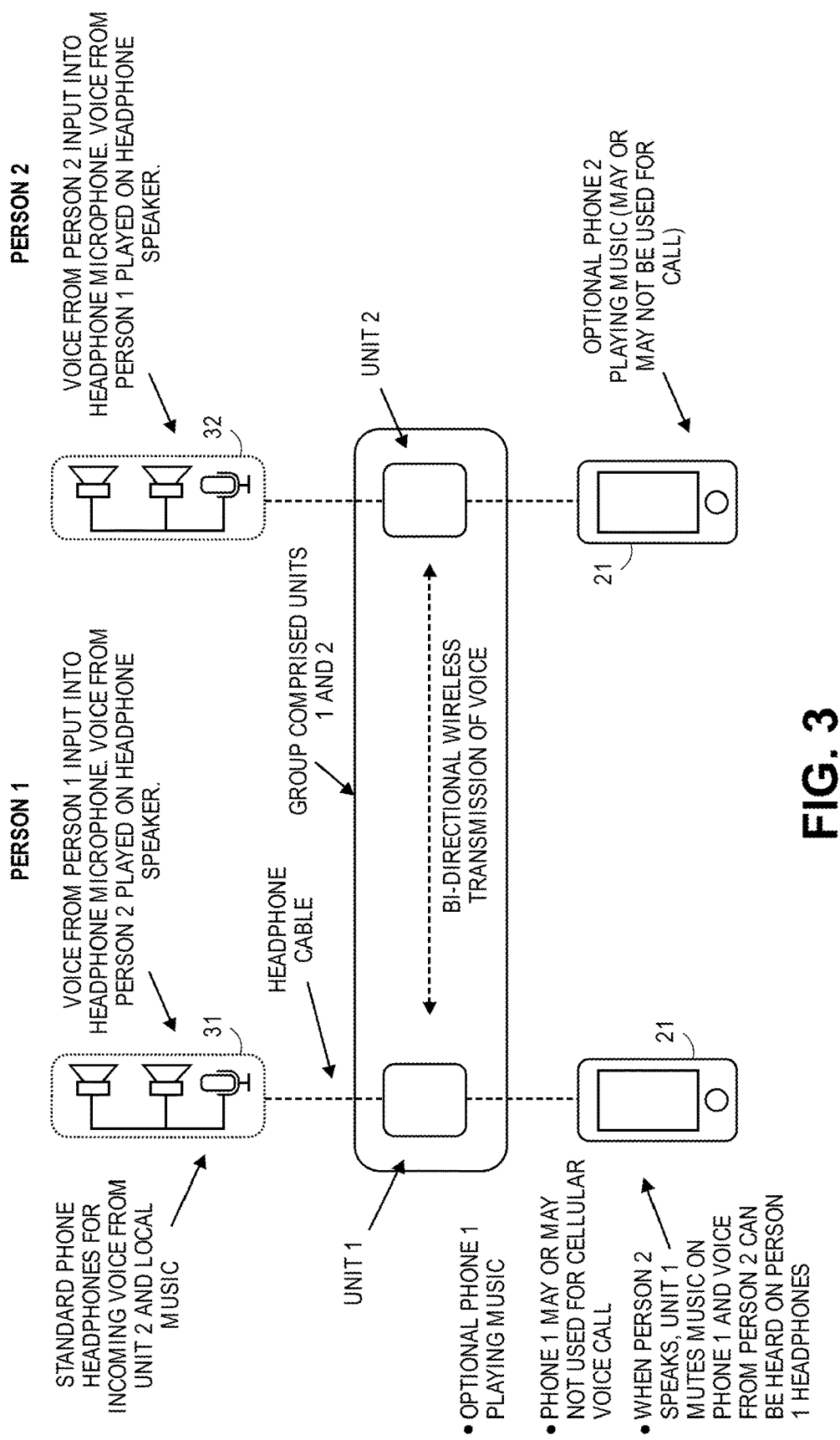
FIG. 3 illustrates use of multiple such portable group communication devices in conjunction with cellular communication devices.

FIG. 2 illustrates use of multiple devices 10 by themselves, i.e. without any other communication devices such as telephones 20. However, embodiments of the invention also allow for devices 10 to be used in conjunction with telephones 20 or other communication devices. As one example, FIG. 3 illustrates use of multiple devices 10 in conjunction with cellular communication devices. Here, two users, (person 1 and person 2), use units 1 and 2 in conjunction with both their respective personal cellular phones 21, 22 and with headphones 31, 32. In this configuration, person 1 and person 2 may communicate with each other via the headphones 31, 32 of their units 1, 2. Such communication may be via, for example, voice, video or text. Phones 21, 22 may also perform other functions for person 1 and person 2. For example, phones 21, 22 may play music for persons 1 and 2 respectively. In such case, the phones 21, 22 may play stored music or other audio to the respective units 1, 2 via wired connection or wirelessly, and this music may be relayed over headphones 31, 32 to the users. Similarly, cellular calls over the phones 21, 22 are passed through the units 1, 2 so that persons 1 and 2 may speak through the same headphones 31, 32. Voice communication between the users may interrupt the music or other phone audio, so that the music or other audio signal playing on the phones 21, 22 is muted, its volume is lowered, or the music or other audio signal is paused so that speech relayed over the units 1, 2 is heard over the headphones 31, 32. When the units 1, 2 stop receiving speech from other units, the volume may increase back to its previous level, or the music/audio signal is un-paused. That is, the users may receive audio from their phones 21, 22, and may also converse with other users via units 1, 2 at the same time, with such conversations interrupting, mixing with or playing over the audio from phones 21, 22.

Figure 4:
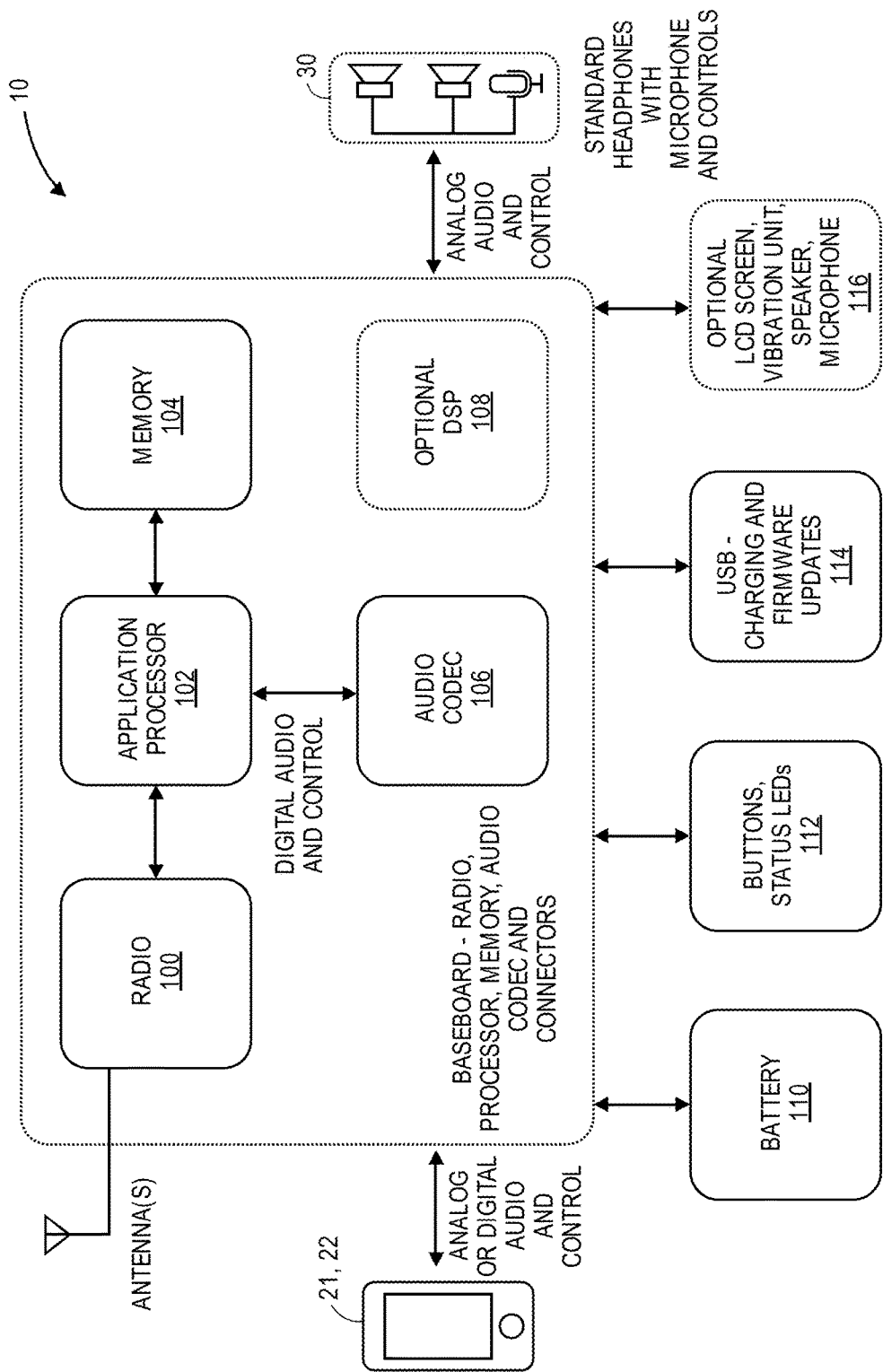
FIG. 4 is a block diagram representation of components of a portable group communication device according to embodiments of the present invention.

Attention now turns to the construction and configuration of devices 10 (i.e. units 1, 2 and the like). FIG. 4 is a block diagram representation of components of a portable group communication device according to embodiments of the present invention. Here, device 10 is a small, portable communications device with radio communication capability, and includes a radio 100, application processor 102, memory 104, audio codec 106, and (optional) digital signal processor (DSP) 108. As is known, these elements may be implemented as one or more integrated circuits packaged and soldered to a printed circuit board or other substrate, which connects to other elements such as a battery 110, various buttons and status lights 112, one or more interfaces 114, and other electronic interface units 116. As above, the device 10 may be connected to a phone 21, 22 and headphones 30.

The radio 100 is a radio frequency (RF) transceiver circuit capable of transmitting and receiving signals in an RF band. Any RF band is contemplated, including but not limited to sub-GHz, ISM, Wi-Fi, and other bands. As one example, transmission and reception may be at frequencies between about 170 MHz to about 2.4 GHz. In some embodiments, transmission and reception frequencies fall with the range of approximately 450 and approximately 900 MHz. The radio 100 may also transmit and receive according to any protocol, e.g. WiFi, Bluetooth or any other protocol.

The application processor 102 may act as a system controller, and may run code implementing any desired features, including audio encoding/decoding, wind noise or other audio filtering processes, volume ramping, voice control command processing, etc. Alternatively, any one or more of these functions may be performed by other elements such as DSP 108.

The memory 104 is accessible by application processor 102, and may store any code and data used by processor 102. For example, memory 104 may store executable code for any of the above described features and for implementation of any of the operations described below.

The audio codec 106 encodes and decodes the audio stream handled by device 10, and may include the compression and decompression of digital audio data according to any desired audio file or streaming media audio coding format. Thus, also included in the device 10 but not shown are filter and digital-to-analog and analog-to-digital conversion circuits for converting analog audio received from the user via headphones 30 to a digital audio signal, as well as for converting digital audio signals received from another device 10 via the Antenna to an analog signal for playback through the headphones 30. Such filter, digital-to-analog, and analog-to-digital conversion circuits are known.

The device 10 may also include an integrated or built-in microphone instead of having a microphone in headphones 30. As another alternative, the device 10 may utilize an external microphone array for improved acoustic performance by, for example, adaptively beam-forming towards the user's mouth. The device 10 may also include an integrated or built-in speaker instead of relying on those of headphones 30.

The battery 110 is a battery for a portable communications device, and stores charge sufficient to power device 10. The battery 110 may be any known or other battery adapted for use in portable electronic devices. The buttons/status lights 112 may be any input devices sufficient to input any form of information to device 10, as well as any output devices sufficient to display information. Exemplary input devices may include on/off/reset buttons, volume knobs or dials, and the like. Exemplary output devices may include light emitting diode (LED) indicators of various states, and the like. These input and output devices may be physical switches, icons on a display or touchscreen, or any other vehicle for input or output of any kind of information or commands.

The interface 114 may be any interface for transmitting and receiving electronic or electrical signals, such as a universal serial bus (USB) interface or the like. The interface 114 may be in communication with the battery 110 and allow for charging thereof, with the processor 102 or memory 104 to allow for updates to firmware or other programs and code, and/or with any other components of device 10.

The other electronic interface units 116 may include any components or structures for conveying information to, or receiving information from, the user. For example, the interface units 116 may include a user interface which can be any one or more of a display such as a liquid crystal display (LCD) screen, touch sensitive display, organic light emitting diode (OLED) display, vibration unit for alerting the user by vibrating, speakers, microphones, a keyboard or keypad, and the like. Interface units 116 may also include interfaces to a mobile phone, media player, tablet computer, laptop computer, desktop computer, or any other electronic device.

The interface units 116 may also include any one or more of various other hardware components that can be integrated into a mobile electronic device 10. For example, any one or more of the following may be included: a second radio providing connectivity in a redundant or different frequency band, an external or internal antenna, near field communication (NFC) hardware, a motion sensor, accelerometer, gyroscope, global positioning system (GPS) receiver, thermometer, camera, speaker, microphone, light sensor, moisture sensor, barometer, magnetometer, touch sensor, battery level meter, fingerprint reader, solar cells for charging the battery 110, mechanical (motion-based) chargers, and a depth gauge. Any interface for allowing connection to an external version of any of the above may also be included.

The components of FIG. 4 are encased within a housing, as shown in FIG. 1. The housing may be any lightweight and portable housing encasing and protecting the various components of FIG. 4. As nonlimiting examples, the housing may be made of a rigid plastic, a metal such as aluminum or steel, rubber, glass, or the like. In many embodiments, it is desirable for the housing and its various components therein to be sufficiently small and lightweight to be carried by users without difficulty during various physical activities. For example, the device 10 may be carried comfortably in a user's pocket during even strenuous physical activities. In some embodiments, it is desirable for the housing of device 10 to be waterproof. The housing may include mounts, brackets, or other fixtures allowing the device 10 to be mounted or carried in or on any equipment or part of the user. For example, fixtures allowing the device 10 to be mounted onto a helmet, carried in a pocket, hung on a backpack or a piece of clothing, extensible rod, or any other item are contemplated by various embodiments of the invention. In this manner, the device 10 may be carried or supported by the user in any manner, allowing for the device 10 to be positioned in any manner convenient for comfort, reception/signal strength (i.e. as high up above the ground as possible, to increase operating range), and the like. The housing may also be durable and rugged so as to be weatherproof, shock resistant, and able to withstand a wide range of impacts as well as temperatures during storage and operation. The housing may also include a replaceable or customizable cover for improved functionality and personalization.

In another embodiment, the complete circuitry of device 10 may be integrated into another device, for example, a camera, a telephone or a tablet. In this case, device 10 may share some of the components, like display, keypad, buttons, battery, application processor, memory, DSP and software code with the other device. In another embodiment, the complete functionality of the device 10 may be implemented using the existing components in the other device without the need to add any additional components.

The Antenna shown in FIG. 4, as well as any other internal or external antennas employed, may be any form of antenna. For example, antennas may be implemented as flexible printed circuit board trace antennas, coiled wires, extendable antennas, or any external antenna. Multiple such antennas are contemplated as well. The device 10 may be programmed to employ known active steering antenna techniques for improved data throughput. The device 10 may also use power amplifiers, range extenders or booster circuitry to enhance the range.

Figure 5:
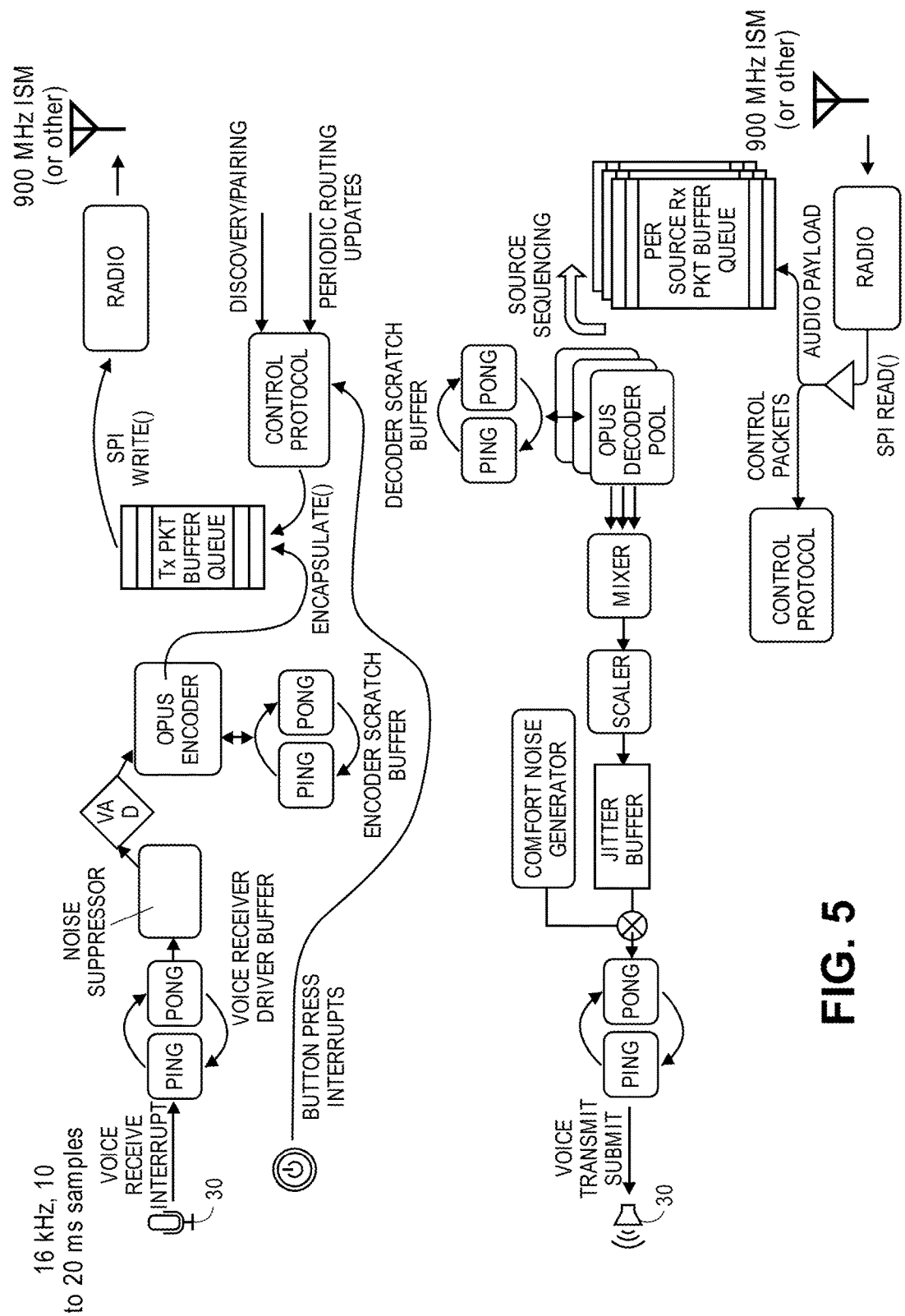
FIG. 5 is a flow diagram illustrating operation of one or more such portable group communication devices.

FIG. 5 is a flow diagram illustrating operation of one or more devices 10. More specifically, transmission and reception of voice/text information is illustrated. In FIG. 5, information flow is shown with reference to logical blocks represented in block diagram form. These blocks may be implemented in any one or more of the modules shown in FIG. 4, such as the radio 100, application processor 102, memory 104, audio codec 106, and/or DSP 108.

In operation, a user may communicate with another group member, either by speaking or texting. This may be carried out by speaking into the headphones 30 (or other microphone) of device 10, or by typing text into device 10 through a unit 116 such as a keyboard GUI represented on a touch sensitive screen, or physical keys present on the outer surface of device 10. In the case of audio, the user's voice or other audible noise is picked up by the microphone in headphones 30, translated by voice receive (Rcv) circuitry into a pulse code modulated (PCM) or other digital audio stream, and transmitted to a Ping Pong buffer for buffering. Audio data are retrieved from this buffer at regular intervals to produce a data stream which is then processed to suppress noise, and sent to a voice activity detector (VAD) to determine whether the stream contains any speech samples. In this manner, the VAD can detect periods of silence. During such silence, data transmission can be halted or reduced to save battery power and channel bandwidth. In some embodiments, the VAD simply transmits voice input when it is detected.

The audio stream is then sent from the VAD to an encoder for audio encoding. This encoder can utilize any codec for encoding, e.g. an open standard codec such as OPUS or the like. The encoder can also utilize a scratch buffer that can be implemented as a Ping Pong or other buffer. Once encoded, audio is encapsulated into packets, buffered in a queue such as a first in first out (FIFO) buffer, and transmitted in order to other devices 10 in the group. Encapsulation may include the addition of other data besides the audio data payload and conventional packet header information, such as a unique ID number identifying the device 10 transmitting the packet or the sequence number of the packet.

Various actions may interrupt packet transmission. For example, user button presses (e.g., on/off/reset/mute, etc.) or the like may instruct a control protocol module to halt the queue, stopping packet transmission. Similarly, the control protocol may transmit other commands to various other modules in response to other button presses such as pairing, unpairing, volume up/down, and the like.

Voice packets received from another device 10 are picked up by a wireless radio component, such as a CC1310 RF transceiver made by Texas Instruments Inc., which parses received packets, sends control packets to a control protocol module, and directs audio payload to a buffer. Multiple such buffers may exist, one for each member of the group, where the packets are directed to the appropriate buffer according to an identifier placed in the packet by the particular group member's device 10 and indicating the particular group member.

Packets may be retrieved from each buffer and sent to a decoder such as an OPUS decoder for decoding the audio stream from each group member. The decoder may employ a scratch buffer such as a Ping Pong buffer if desired. Multiple decoders may be employed, one for each remote device, i.e. one decoder and buffer for each remote device to decode the voice data stream from each user in the group. The decoded data streams from these decoders are then mixed by a mixer, to form a single data stream. The mixer may combine the separate decoded data streams in any manner, such as by standard mixing, reducing the volume of audio from those units or nodes that are farther away, and may mix in audible indicators such as tones to indicate that a new user has joined, one has left the group, battery low indication, etc.

The mixed data stream may then be sent to a volume scaler, which implements a scaling procedure that scales the magnitudes of the signals to an appropriate volume, for example a volume that is not excessively loud or too high to be supported by the output hardware. Scaling may be performed in any manner, such as in a manner that gives users an experience similar to multiple people speaking nearby each other.

After scaling, the scaled audio stream is stored in a jitter buffer, which allows the device 10 to adjust for variations in packet arrival time, so as to provide users clearer audio without distortions caused by delayed or lost packets. A comfort noise generation (CNG) module then adds comfort noise if desired, to fill silent portions of the audio stream with a low but audible level of artificial noise that indicates to listeners that their connection is not lost. The resulting audio output is buffered in another Ping Pong buffer for output to the audio Tx hardware of the user's audio output device, such as headphones 30.

Figure 6:
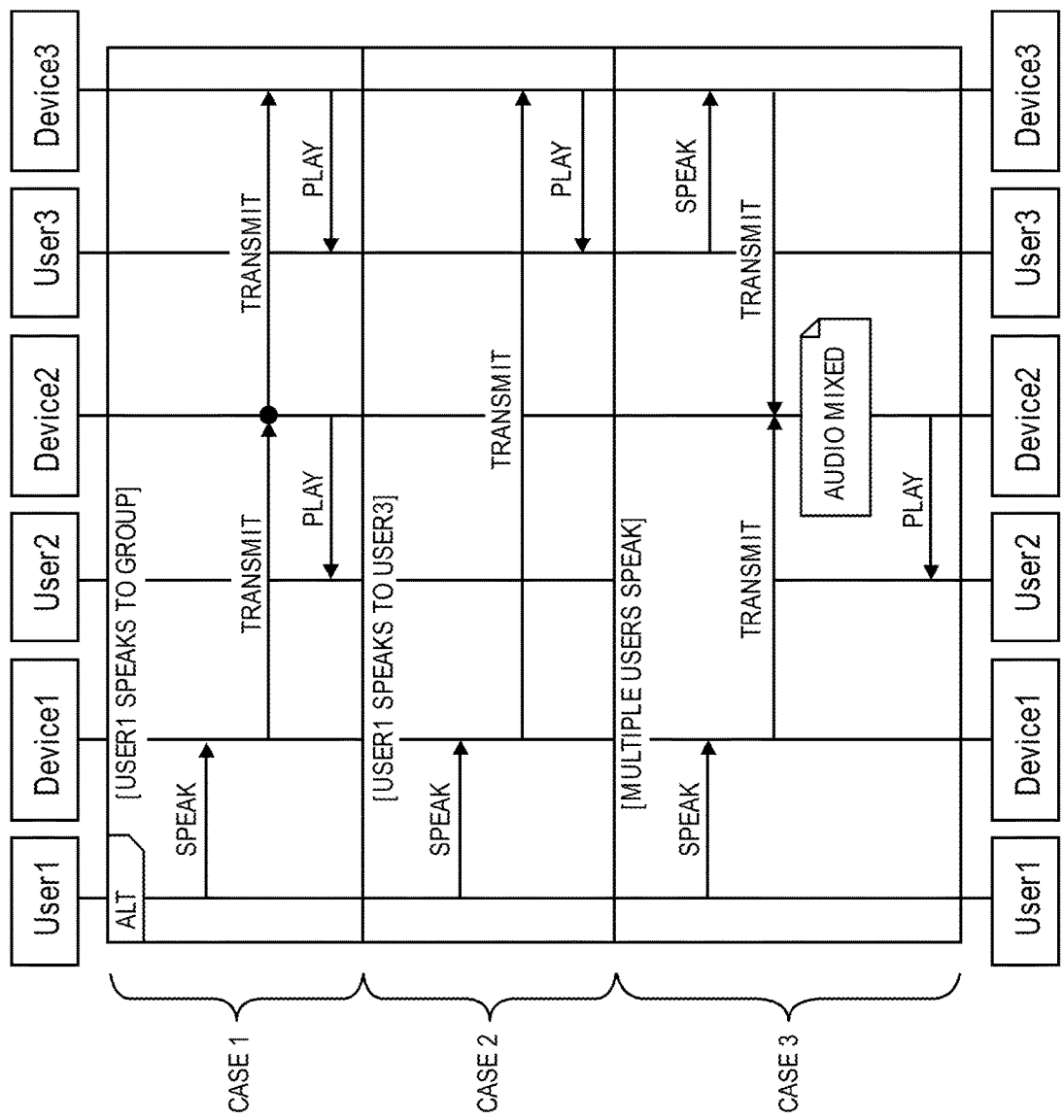
FIG. 6 is a sequence diagram describing voice operation of multiple portable group communication devices of embodiments of the present invention.

In this manner, multiple devices 10 can broadcast and receive audio among each other, with each device 10 broadcasting its audio to every other device 10 in the group, and also receiving audio from every other device 10 in the group. That is, one of ordinary skill in the art will observe that the audio transmission and receiving processes and operation described in FIG. 5 may be employed by each device 10 of a group, to transmit and receive audio among each of the devices 10 in the group. FIG. 6 is a sequence diagram further describing such operation, illustrating voice transmission and reception between and among three users user1-user3 and their three associated devices 10 device1-device3. In an environment with multiple users, more than one use case exists. For example, one user may wish to speak with the entire group, some users may wish to speak with only some subset of the entire group, and multiple users may wish to speak simultaneously. FIG. 6 illustrates use of devices 10 in three such cases. In Case 1, user1 may wish to speak to the entire group. In some embodiments, this may be the default case. Here, user1 may speak into his or her device1, whereupon device1 converts the received audio to a packet stream according to the process described above in connection with the top half of FIG. 5, and transmits this packet stream to both device2 and device3 (and in this example, device3 receives the stream from device2 where device2 acts as a forwarding node). Both device2 and device3 receive and play back this audio stream for their users user2 and user3, according to the receiving and decoding process described above in connection with the lower half of FIG. 5.

In case 2, user1 may wish to speak only with user3, and not with user2. User1 would then issue a command to device1 either via a button press or voice command, instructing device1 that its audio is intended only for device3. User1 then speaks to user3, with device1 converting and transmitting a packet stream as above, and inserting an indication within the packets that they are intended only for device3.

Packets received by device2 are thus disregarded, while packets received by device3 are decoded and played back as above. Alternately, device3 may accept packets from device2 but may elect to not process these packets.

In case 3, multiple users (user1 and user3) may wish to speak at the same time. Both user1 and user3 speak into their microphones 30 and their devices device1 and device3 each encode and transmit their respective audio streams to the other devices in the group. While transmission is shown as being only from device1 and device3 to device2, actual transmission may be from each of device1 and device3 to the other devices in the group. Device2 receives both audio streams, mixes them as above, and plays the mixed stream to user2. User2 thus hears the voices of user1 and user3 simultaneously.

Embodiments of the invention thus yield devices that allow for groups of people to be in radio contact with only each other, and to communicate over significant distances in a "group chat" manner in which, similar to a conference call, all users may speak and hear each other at the same time. In addition, users may choose to speak only to selected other members of the group. As the devices are small, lightweight and portable, they allow for groups of people to communicate with each other while carrying out other activities. For instance, groups of hikers, skiers, or cyclists, etc. may use the devices of embodiments of the invention to keep in contact with each other while performing these activities. As radio or other wireless communication is employed, the activities of the users do not need to be interrupted during communication. Thus, users may readily talk to each other while on the move, e.g. while they are all skiing, and may maintain communication even while considerable distances apart from each other and moving relative to each other.

Added Functionality

It is noted that the architecture of devices 10 of embodiments of the invention allow for additional functionality besides that described above. Exemplary added functionality may be implemented by any one or more of the application processor 102, audio codec 106, and DSP 108 in known manner, and is listed and described as follows. If desired, devices 10 may implement any one or more of the following functions:

SMF Protocol: Simple Multicast Forwarding (SMF) may be employed in encapsulation by device 10. SMF provides certain advantages, e.g. it does not require route assessment (beacon) packets, may incur the same resource cost in the linear network case (where devices 10, or nodes, are in a straight line) and collaborates to cover packet loss in dense configurations where nodes are all in close proximity or other configurations. SMF may increase the total packet count transmitted on the network; this can be addressed by increasing the packet data rate.

Retransmissions: Devices 10 may employ any number of retransmissions for each packet in order to decrease the probability of lost packets. The number of retransmissions may be dynamically adjusted depending on factors like packet drops, network congestion, number of nodes in the network and battery power available. Retransmission criteria and number may be programmed into, for example, the control protocol module.

Security: It may be desirable that communication within an associated group be performed in a secure manner. Accordingly, voice packets may be encrypted to ensure that devices that are not a part of the associated group cannot decrypt or understand the communication. Encryption may be performed as part of the encapsulation process.

Interference Protection: It may be desirable for multiple associated groups to be able to co-exist in vicinity without interfering with each other. Multiple access protocols like FDMA, TDMA, CDMA or others may be used to ensure that the devices 10 can detect whether a received packet belongs to the associated group that it is a part of Devices 10 may also employ suitable collision detection and avoidance mechanisms like CSMA-CA (Carrier Sense Multiple Access—Collision Avoidance), frequency hopping or others to ignore transmissions from other devices that may be transmitting on the same wireless frequency. Embodiments contemplate implementation of any of these or other suitable protocols.

Automatic selection of frequency based on geographic region: Each country has its own set of unlicensed radio bands. To work in multiple countries, devices 10 may support multiple industrial, scientific and medical radio (ISM) bands. Devices 10 may determine which country they are currently within through any source—cellular network, Wi-Fi, GPS or other mechanisms such as an associated configuration mobile application, manual setting or other scheme.

Dynamic compression: Bandwidth: Generally audio compression has two potential side effects—power consumption, and loss of quality. If there is sufficient bandwidth available in the system, then compression need not be done at all. In practice, the bandwidth may be both limited and variable. A dynamic compression algorithm may be desirable to adapt to the available bandwidth so as to provide best quality and least power consumption, increasing battery life. This may be implemented by dynamically switching among the available voice encoding options (such as OPUS or other) including dynamically adjustable bitrate, audio bandwidth and frame size. That is, the application processor 102 may implement and switch among different encoders according to available bandwidth, and may also implement and switch among different decoders according to the encoding used for the data in received packets.

Higher bitrate transmission may consume more battery. As the battery level drops, devices 10 may enter into a "battery save" mode where audio is progressively encoded at a lower bitrate, potentially enabling battery life to be extended at the expense of degraded audio quality.

Generally, as the distance between devices 10 increases, the available bandwidth may decrease. A dynamic compression algorithm will adapt to the available bandwidth so as to preserve audio quality.

In a congested wireless environment, it may be possible that the packet drop rate is high. In such a scenario, devices 10 may be programmed to decrease the bit rate and increase the number of retransmissions in order to increase the probability of their packets reaching the other devices 10 in the group.

Messaging and Other Data Transfer: Devices 10 are not limited to voice communication—the system may also support, for example, text-based messaging using a user interface or app on a connected phone, where a cellular or Wi-Fi internet connection may not be available. Text may be input via the phone user interface, such as through a dedicated device 10 or other messaging app, and data may be sent over Bluetooth or analog cable to device 10 for transmission to other devices 10.

Video calls: Devices 10 may also support video communication, for example, a video call between two or multiple users. The video capture may happen through a camera integrated into device 10 as one of the units 116, or via the phone/tablet/laptop interface. Similarly, the video playback may happen on the display attached to device 10 or through a phone/tablet/laptop interface.

Voice Activated Transmission: voice activated transmission of speech when speech is detected. Devices 10 may employ known or other techniques and processes for voice activity detection.

Audible Relative Position: when voice is rendered at a receiving device 10, the relative position of the sender may be indicated. This may be useful, for example to avoid collisions while cycling or skiing. Position information may be encapsulated in transmitted packets according to, for example, information from a GPS module in the transmitting device 10.

Audible Relative Distance: when voice is rendered at a receiving device 10, the relative distance among members of a group may be indicated by varying the volume of each of the rendered received voice streams.

Voice Commands: Devices 10 may be programmed with code for recognizing simple spoken commands, for example "Mute Group" or "Speak Only With Jane". Voice commands may be implemented by integrating an open source or commercial voice recognition SDK such as TrulyHandsfree from Sensory (sensory.com).

Speech Volume Based Receiver Selection: Devices 10 can implement a scheme where the volume of a speaker is used to control which other devices 10 receive and render the speech—for example, quiet speech may be rendered at devices 10 within close proximity and louder speech at devices 10 further away, not unlike natural human speech among members of a group. More broadly, the volume of the speaker may be recognized and used by devices 10 to determine the volume of the reproduced audio, in any manner.

Naming a Node: A unit can be "named" by a user, during for example a setup process in which an audible prompt may ask the user to name the unit and the voice recording is used to assign a name (for example "Jane"). The assigned audio name may be converted to text and used for voice controlled addressing by other members ("Speak only with Jane") or for notifications (e.g. "Jane has left the group").

Private Talk: A user may initiate a private session with one or more selected members of the group, effectively temporarily muting the transmission of voice to or from members who are excluded from the group. This may also include functionality such as a "mute-all" where a user does not wish to participate in group communication. Muting can be done via any UI available on a device 10, including via a voice command. In the latter case, multiple voice commands are recognized, such as muting a particular username, muting everyone, etc. There may also be a visible indication (For example "Red" LED on) to indicate a mute state.

Broadcast Mode: Devices 10 may provide a "one-way" mode, for situations such as sports training where the instructor may be speaking to a group, including to other electronic devices (such as over Wi-Fi or Bluetooth or other protocol).

Open Mode: Devices 10 can also provide a mode allowing any other device 10, including units not explicitly paired or grouped, to communicate.

Audio "Emoji's": Devices 10 may allow sending out of audible notifications, for example two fast taps on a button may correspond to "Attention!". Audible notifications may be stored in memory 104 and retrieved upon the proper button taps or other input.

Alerts and Notifications: Devices 10 can be configured to generate alerts in the form of audible notifications (such as playing pre-defined sounds stored in memory 104), vibration alerts, LEDs or other means. This may be useful to indicate scenarios where the device 10 may be approaching an out-of-range situation, when a member has left the group, re-joined the group, switched off their unit and so on. This may be particularly helpful to overcome the problems found in two-way radios and other systems where a user may need to repeatedly ask "are you there", leading to frustration.

Link Quality: Devices 10 may provide a method to assess and indicate the link quality, to enable a member to perform certain actions, such as announcing to the group that they may be leaving the group or moving closer to other members.

Location Indication: Devices 10 may provide a method to determine and indicate the locations of other devices 10, or their relative location or orientation. This may be done by, for example, periodically or upon request transmitting GPS coordinates from each device 10.

Emergency Beacon: Devices 10 may incorporate an emergency indicator, such as via a panic button, to send a distress signal to all devices 10 within range. This may be useful in cases of emergency where the user may be immobilized or may need medical attention. In this case, the emergency signal may also be broadcast to all nearby devices 10 and not limited to units explicitly grouped.

Motionless Indication: Devices 10 may also generate an alert to members of a group where one device 10 is motionless, submerged for more than a certain duration or in some other potentially distressed situation.

Voice Snippets: Devices 10 may allow sending of short voice recordings between devices 10. This may also include recording and playback of voice snippets when a member has left a group and later re-joined.

Noise reduction: Devices 10 can implement noise reduction techniques, including wind-noise and other ambient noise reduction DSP filtering, where the noise picked up by the connected microphone 30 is reduced through a digital signal processing filter in the application processor 102 before the resulting audio stream is transmitted to other devices 10. Noise reduction may also be adaptive to environment/noise type—e.g. surf noise, motorbike noise. Noise reduction may also be speed dependent, where the speed of a device 10 is determined through GPS or other means. Noise reduction may also be mechanical, using techniques such as foam padding around the microphone element.

Echo Reduction: Devices 10 may implement echo cancellation, to stop radio transmission where other devices 10 may be close enough to hear voice directly, but only for those people. This may be implemented by proximity detection, for example, based on RSSI between device 10 radios, or other means.

Mixing: Devices 10 may mix the voice received from various units, tones, or music from an attached or Bluetooth-paired phone. The volume level of each signal while mixing may be adjusted based on the situation. For example, when the user is listening to music from the attached phone 20 and there is incoming received speech—the music may not be stopped but rather the music may slowly be faded out and the voice signal may be faded in. This may give a preferred user experience as compared to abruptly stopping one input and starting another other. In another scenario, when multiple users are speaking, the volume of each user may be adjusted based on the distance—the volume of the user who is farther away may be lower as compared to the user who is close by, for instance.

Pairing and Grouping: Push-button pairing between any two devices 10 to link the nodes for communication, whereby a user presses a "link" button on one unit and then presses a "link" button on another unit, and an LED or some other indicator shows when a connection is established between the two devices 10. The connection persists on power off/on. To add a new device 10 to an existing group, the process is repeated using any member of the group and the new unit to be added. Pairing may also use proximity sensing (such as RSSI) to pair only to other nodes within a pre-set distance range (e.g. <2 m). Pairing may be removed by repeating the procedure between any two previously paired units. Besides push-button, pairing may also be initiated by other means like voice commands, NFC proximity, waving or shaking two devices 10, LED flashing, or positioning units in a specific manner (like upside down).

Figure 7:
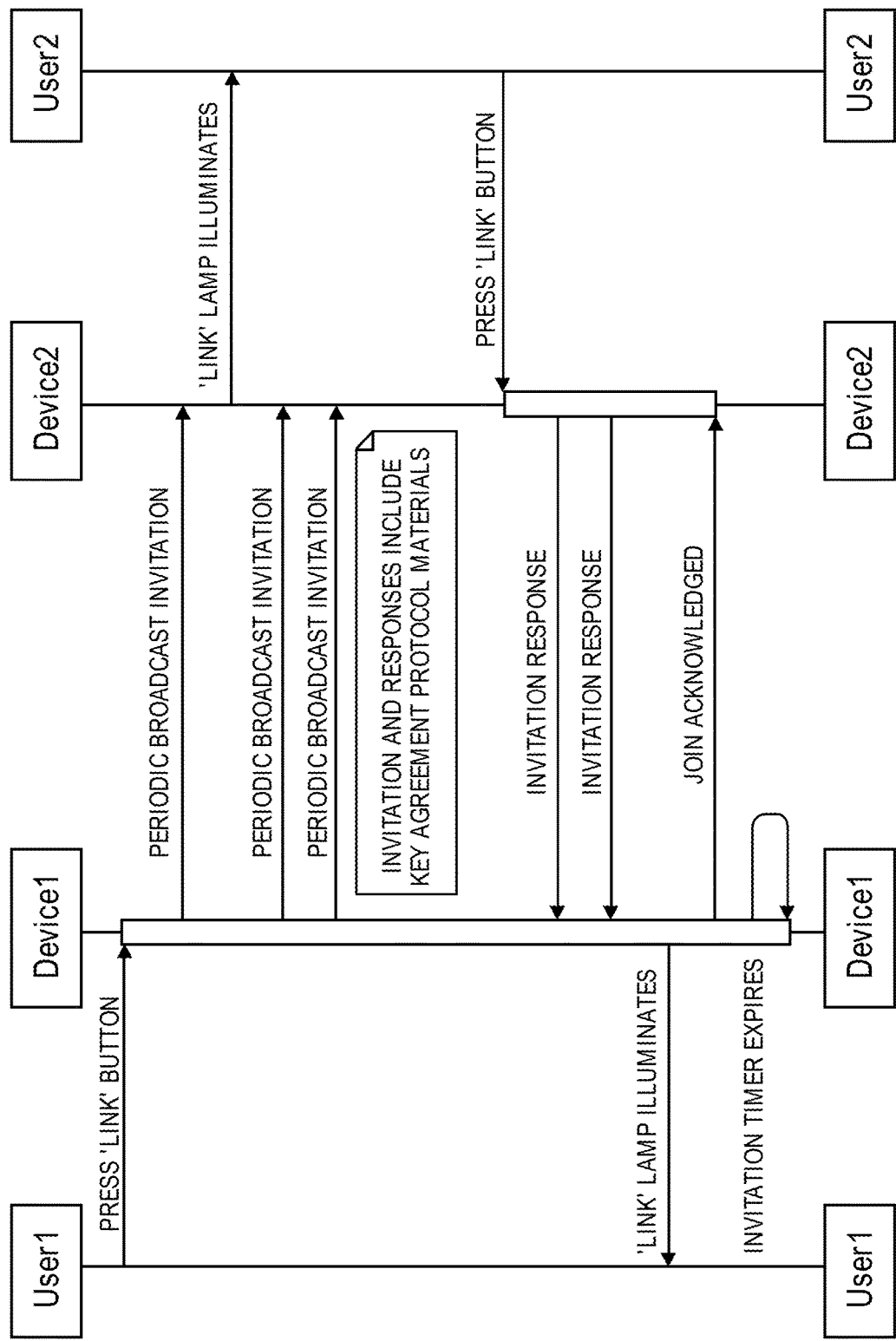
FIG. 7 is a sequence diagram describing a secure group admission process for such portable group communication devices.

FIG. 7 is a sequence diagram describing a secure group admission process for portable group communication devices of embodiments of the invention. For purposes of illustration, user1 and user2 may wish to form a group. User1 may instruct his device 10 to begin the group formation process, such as by pressing a "link" button on his or her device 10. As above, this button may be a physical button or a virtual one, such as an icon on a display, a prompt, a voice command, or the like. In response to this button press, device1 broadcasts periodic group invitation messages to other devices in range. Thus, devices in range, such as device2 shown in FIG. 7, receive one or more invitation messages and, in response, display an indicator of a group invitation to their user. In this case, device2 may turn on a link indicator, such as a light or LED, notifying user2 of a group invitation. In the meantime, device1 continues to broadcast periodic invitations.

User2 may ignore the request, which may time out after a predetermined time, or accept. Acceptance may be by pressing an appropriate button on device2, responding to a prompt, etc. Upon acceptance, device2 begins broadcasting periodic invitation response messages to any other device in range, as shown. Upon receiving one or more of these response messages, device1 turns on its link lamp or other indicator, indicating to user1 that user2 has accepted his or her group invitation. Device1 then broadcasts a join acknowledge message acknowledging to device2 that it has joined the group.

Invitations and responses may each be performed according to any accepted protocol, and may each include any information required or consistent with the protocol. For example, messages may include a security key, a unique identifier such as the MAC address of the device sending the message, a random number, or the like. Subsequent packets sent between group devices may include these identifiers, so that receiving devices acknowledge and use packets from other devices in the group, and ignore or reject those with identifiers of devices not in the group.

In certain embodiments, it may be desirable to range-limit group invitations. More specifically, device2 may look at the signal strength of the invitation signal, and ignore the invitation if the signal is too weak, i.e. if device1 is too far away (indicating a likely accidental group invite) or the connection is too unreliable. Likewise, device1 may examine the signal strength of device2's response message, and decline/ignore it if it is too weak, and device2 may also examine the strength of device1's acknowledge message.

Operation in Conjunction with Phones or Other Devices

As described above with reference to, for example, FIG. 3, devices 10 may operate in conjunction with phones 20 or other electronic devices. This allows for added functionality when operating devices 10. More specifically, various functions of phones 20, such as music playback, may be made available through devices 10. In this manner, devices 10 may allow for group communication while also supporting functions of phones 20 such as music.

Figure 8:
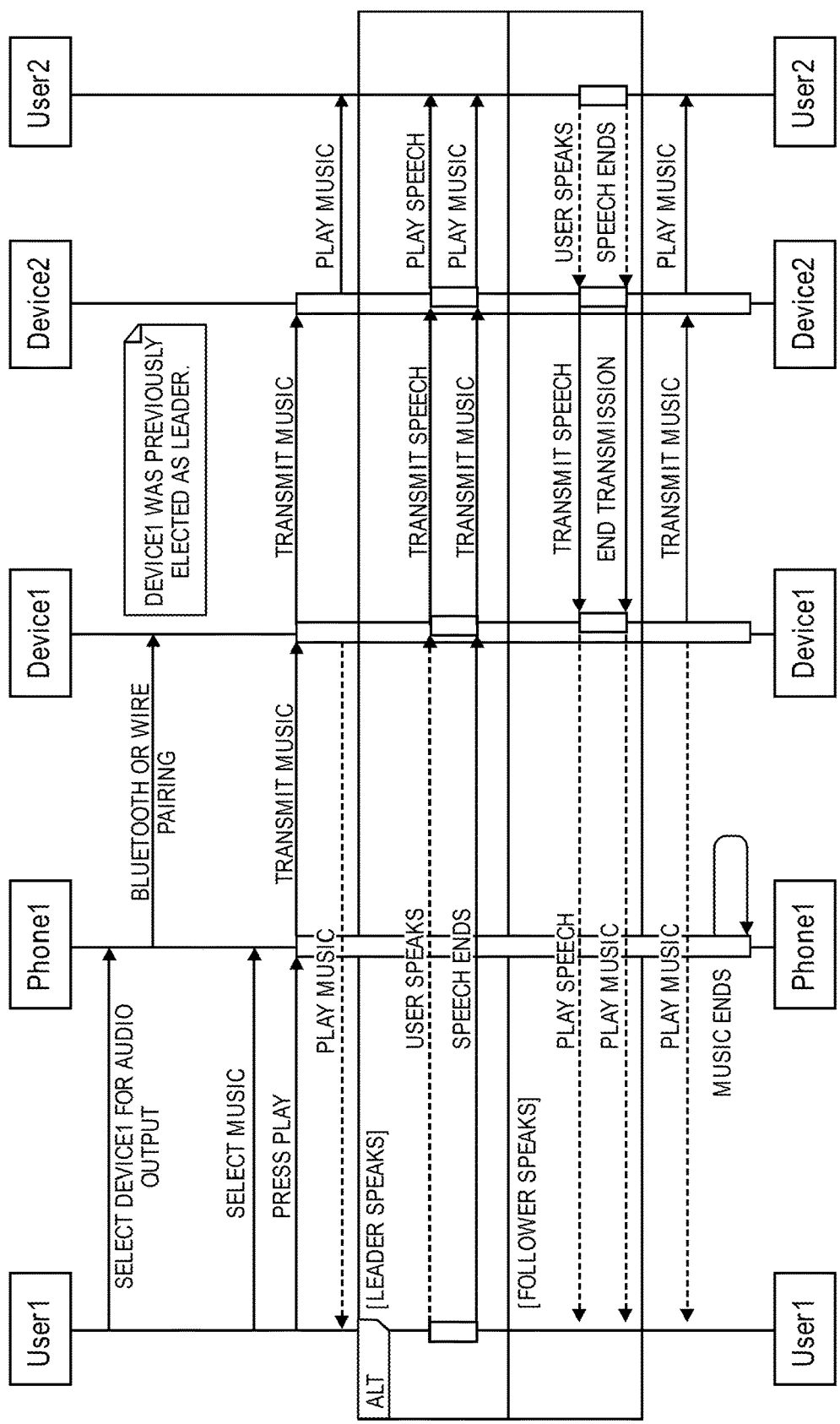
FIG. 8 is a sequence diagram describing combined music and speech operation of such portable group communication devices.

FIG. 8 is a sequence diagram describing combined music and speech operation. In FIG. 8, user1 and user2 communicate with each other via their devices device1 and device2, while device1 is also connected to phone1. Here, user1 first decides to listen to music, and accordingly instructs his phone1 to play music or other audio through device1. The phone1 pairs with device1 in known manner via any wired or wireless communication protocol, such as Bluetooth or via cable connection. Once user1 selects his or her desired music on phone1 and presses PLAY, phone1 transmits the selected music or other audio file to device1 for playback.

Embodiments of the invention allow one device in a group to be selected as Leader, with the rest of the devices in the group then being Followers. In this arrangement, if the Leader plays music, this same music is also played to each of the Followers. Thus, device1 transmits its received music to device2 as well, and both devices play this music. User2 thus hears the same music as user1 selects and hears.

When user1 (i.e. the Leader) speaks, device1 picks up his or her speech, halts music playback, halts transmission of music to device2 (so that device2 also halts music playback), converts the received speech to a digital audio signal as above and transmits the audio stream to device2. Device2 then plays the audio stream to user2. When user1's speech ends, device1 stops transmitting audio to device2, resumes music playback to user1, and also resumes transmission of music to device2. Thus, when user1 stops talking, both device1 and device2 resume playing music.

When user2 (i.e. the Follower) speaks, device2 picks up his/her speech, and transmits the resulting audio stream to device1. Device1 then halts music playback to user1, halts transmission of music to device2, and plays the audio stream instead. When user2 stops speaking, device2 ends audio transmission to device1. Device1 then stops audio playback, resumes music playback to user1, and also resumes transmission of music to device2. Thus, when user2 stops talking, both device1 and device2 resume music play.

Embodiments of the invention also include further functionality. Exemplary added functionality may be implemented by any one or more of the application processor 102, audio codec 106, and DSP 108 in conjunction with a phone 20 or other device, in known manner, and is listed and described as follows. If desired, devices 10 may implement any one or more of the following functions:

Phone connectivity: Device 10 can connect to a phone over a wired analog or digital connection, or via a wireless connection such as Bluetooth. It may also be paired to a phone 20 over Bluetooth and possibly concurrently paired to Bluetooth headphones. It may also be connected over an analog, digital or Bluetooth connection to an external speaker.

Phone Call Control: Use cases related to phone interaction are enabled or disabled, depending on whether a device 10 detects that it is connected to a phone. For example, the user may be able to mute phone calls from their device 10 or receive indication of the caller name, phone number, etc. on the device 10.

Connected Phone Calls: When a call is received from a connected cellphone, the call is passed through the device 10, which may accordingly stop its on-board radio transmission. The user may also prefer to give priority to the on-board radio transmission of the device 10 over the phone call or route the phone call to other devices 10.

Shared Phone Calls: A device 10 may be configured to enable the sharing (streaming) of a single cellular call among multiple devices 10.

Music and Transmitted Voice Control: The device 10 may mix two streams of audio, where the first stream is continuous such as music from a connected phone and the second is intermittent speech received from another device 10. For example, music volume may be lowered so that the speech can be heard over the music. Music volume may be ramped down as a function of the duration of the conversation or speech. For instance, more speech decreases the ramp speed. Generally, the music stream is played at full volume and when the second stream contains speech, only the second stream is played (or, instead of outright muting, both streams are combined but the volume of the first stream is significantly lowered). After speech ends, the volume of the first stream may be ramped back up as a function of time, at a constant rate, or at a rate determined by the probability that further speech acts will ensue. For example, a sigmoid-like music-adjustment volume curve may be employed as a function of numbers and durations of idle events and speech-detected events, so that more talk=flatter volume curve. Thus, long conversations will be free of bursts of music but isolated speech acts will be followed quickly with a return to full volume music.

"Tap-on-shoulder" situation: Include functionality to mute music where users are in close proximity (as determined by GPS or perhaps NFC), without transmitting speech (so as to, for example, address the common situation of needing to tap a person on the shoulder to speak with them because they are listening to music).

Local storage for music files: for listening to music without connected phone or for storing past conversations or videos. Received audio or files may be stored for future local retrieval and playback.

Voice Recording: Devices 10 may also store conversations. The recorded voice may be time stamped, location stamped or marked in some other way, possibly in connection with another accessory such as a GoPro™ or other video or photo capture device, to later allow synchronized playback of the voice with the video or photos.

Audio Watermark: The common voice, or an added non-audible watermark track or other syncing method (such as a global clock signal or the like) may also be used as the means to synchronize videos and audio/text captured on a multitude of devices, such as GoPro™ or similar devices, thereby facilitating the recreating of a multi-media, multi-view experience.

Other Devices: The functionality described here is not limited to control and interoperation with cell phones. Devices 10 may also be connected to other devices such as tablets or notebook computers, as will be understood by one of ordinary skill in the art.

It should be noted that the present invention can be implemented in software and/or in a combination of software and hardware, e.g., using application specific integrated circuits (ASIC), a general purpose computer or any other hardware equivalents that can implement and carry out any of the modules and processes described above. In one embodiment, the above described functions and processes can be loaded into memory 104 and executed by processor 102 and/or DSP 108 to implement the functions as discussed above. In another embodiment, this functionality may be integrated into another device like a phone or tablet.

The embodiments were chosen and described in order to best explain the principles of the invention and its practical applications, to thereby enable others skilled in the art to best utilize the invention and various embodiments with various modifications as are suited to the particular use contemplated. Additionally, different features of the various embodiments of the present invention, disclosed or otherwise, can be mixed and matched or otherwise combined so as to create further embodiments contemplated by the invention.

What is claimed is:

1. One or more portable communication devices, comprising:
in each portable communication device, a user interface, one or more digital processors in electronic communication with the user interface, and at least one memory in electronic communication with the one or more digital processors, the one or more digital processors and the at least one memory collectively configured to implement simultaneous radio frequency voice communication between a portable communication device and multiple other ones of the one or more portable communication devices, the voice communication comprising:
pairing the portable communication device with another one of the one or more portable communication devices by a direct link between the portable communication device and the other one of the portable communication devices, wherein the pairing comprises sending from the portable communication device an invitation message, and in response to receiving an invitation response message from the other one of the portable communication devices, sending from the portable communication device a join acknowledge message acknowledging to the other one of the portable communication devices that the portable communication device and the other one of the portable communication devices have joined a group;
transmitting audio data corresponding to speech of a user directly via a wireless medium to each of the other ones of the portable communication devices,
receiving directly via the wireless medium audio data from each of the other ones of the portable communication devices, and
transmitting the received audio data to the user so as to provide to the user combined and simultaneous speech of users of each of the other ones of the portable communication devices, wherein the audio data transmitted and received between the portable communication device and each of the other ones of the portable communication devices are transmitted and received over the wireless medium only and are transmitted and received directly between the portable communication device and each of the other ones of the one or more portable communication devices.

2. The one or more portable communication devices of claim 1, wherein each of the one or more portable communication devices comprises a rigid housing, and the user interface is positioned on the housing.

3. The one or more portable communication devices of claim 1, wherein the user interface includes one or more of an electronic display, one or more buttons, one or more dials, a touch sensitive display, and an audible speech interface.

4. The one or more portable communication devices of claim 3, wherein the audible speech interface includes one or more of an audio speaker interface and at least one microphone interface.

5. The one or more portable communication devices of claim 4, further comprising computer readable instructions stored in the at least one memory, the instructions comprising instructions for carrying out one or more voice initiated processes.

6. The one or more portable communication devices of claim 5, wherein the one or more voice initiated processes include processes for one or more of voice activated transmission of the audio data, and determination of one or more commands from a voice of the user of the portable communication device.

7. The one or more portable communication devices of claim 6, wherein the commands include commands for muting the other ones of the portable communication devices, directing the transmitted audio data to only a subset of the other ones of the portable communication devices, and assigning an audible name to one or more of the other ones of the portable communication devices.

8. The one or more portable communication devices of claim 5, wherein the one or more voice initiated processes include processes for determining a volume of the speech of the user.

9. The one or more portable communication devices of claim 1, further comprising computer readable instructions stored in the at least one memory of each of the one or more portable communication devices, the instructions comprising instructions for initiating one or more of:
- a broadcast-only mode in which the receiving audio data, the mixing, and the transmitting the mixed audio data are disabled;
- an open mode allowing communication with devices besides the other ones of the portable communication devices;
- a determination of a quality of the received audio data;
- a determination of locations of the other ones of the portable communication devices;
- a determination of whether one of the other ones of the portable communication devices is out of range or approaching out of range;
- a determination of whether one of the other ones of the portable communication devices is turned off;
- transmission of a distress signal;
- a determination of a motionless state of one of the other ones of the portable communication devices;
- a reduction in noise of the received audio data;
- an echo reduction;
- a generation of a comfort noise; and
- a mixing of the received audio data with another audio data stream.

10. The one or more portable communication devices of claim 9, wherein the another audio data stream is a music stream provided from a locally connected device other than another portable communication device.

11. The one or more portable communication devices of claim 1, further comprising computer readable information stored in the at least one memory of each of the one or more portable communication devices, the information corresponding to one or more notifications for the user.

12. The one or more portable communication devices of claim 11, the notifications including one or more of a vibration alert, an illumination of a light, and a visual alert displayed on a display.

13. The one or more portable communication devices of claim 11, the notifications including an audible alert.

14. The one or more portable communication devices of claim 1, further comprising computer readable information stored in the at least one memory of each of the one or more portable communication devices, the information corresponding to a voice recording.

15. The one or more portable communication devices of claim 1, wherein in each portable communication device, the one or more digital processors and the at least one memory are collectively further configured to establish the group with the other ones of the portable communication devices so that the voice communication occurs only between the user of the portable communication device and the other portable communication devices of the group.

16. The one or more portable communication devices of claim 1, wherein the voice communication further comprises mixing the received audio data from the other ones of the portable communication devices, and the transmitting the received audio data to the user further comprises transmitting the mixed audio data to the user.

* * * * *